Jan. 15, 1924.
L. Z. LA FOREST
1,480,619
CORRECTION INDICATOR FOR SOUND RECORDING AND REPRODUCING MACHINES
Filed Jan. 28, 1921
2 Sheets-Sheet 1
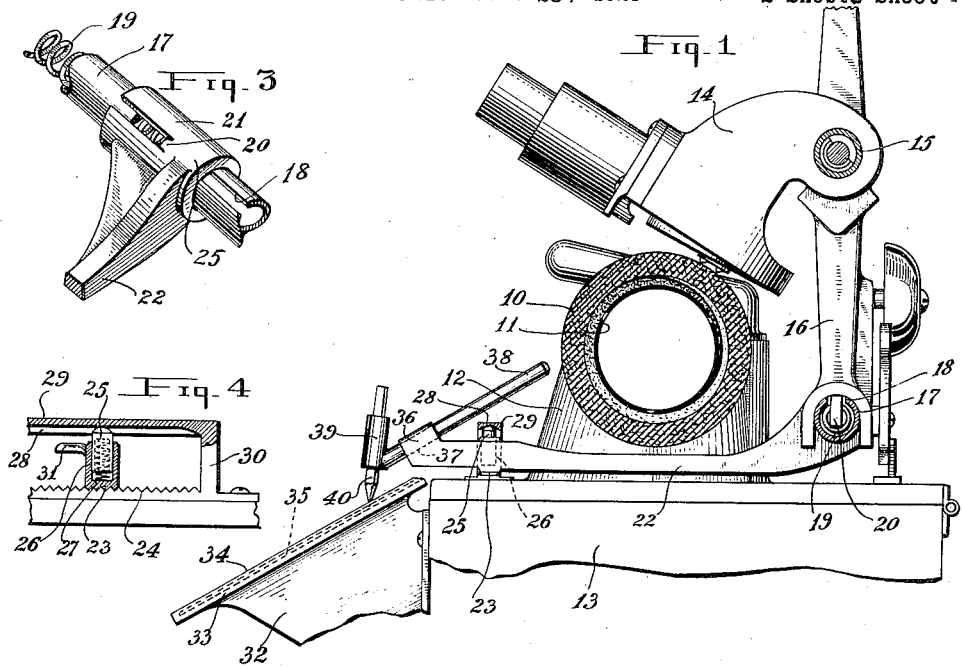
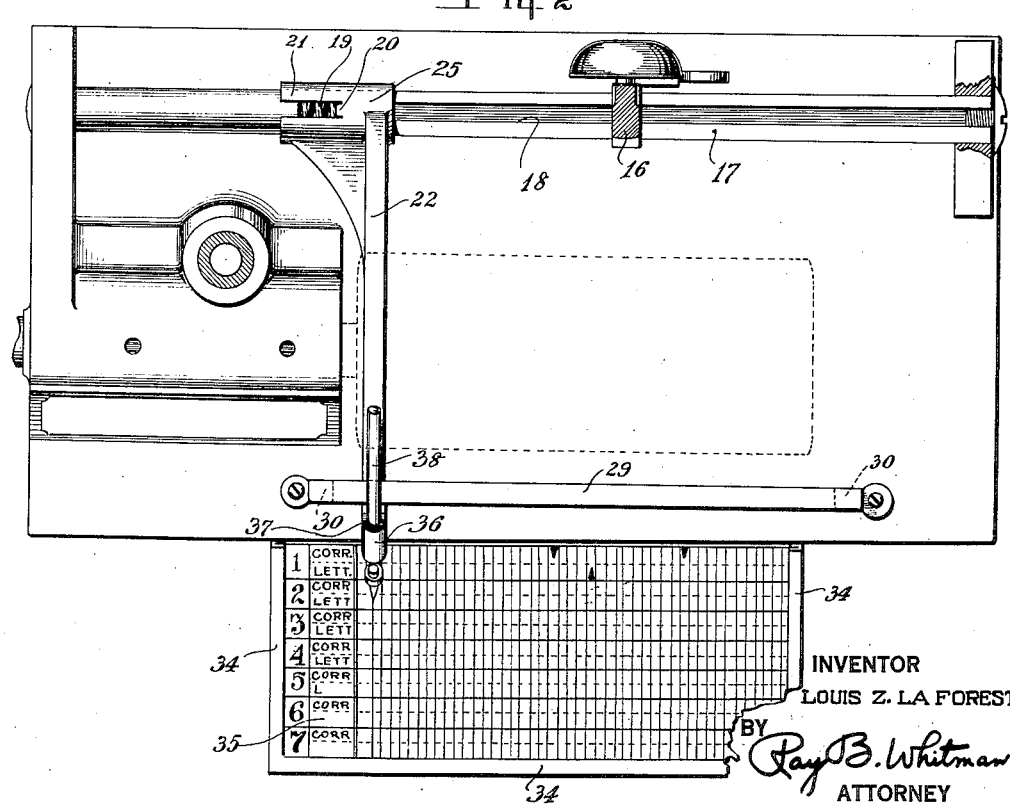
INVENTOR
LOUIS Z. LA FOREST
BY
Ray B. Whitman
ATTORNEY Jan. 15, 1924.  
L. Z. LA FOREST  
1,480,619  
CORRECTION INDICATOR FOR SOUND RECORDING AND REPRODUCING MACHINES  
Filed Jan. 28, 1921   2 Sheets-Sheet 2
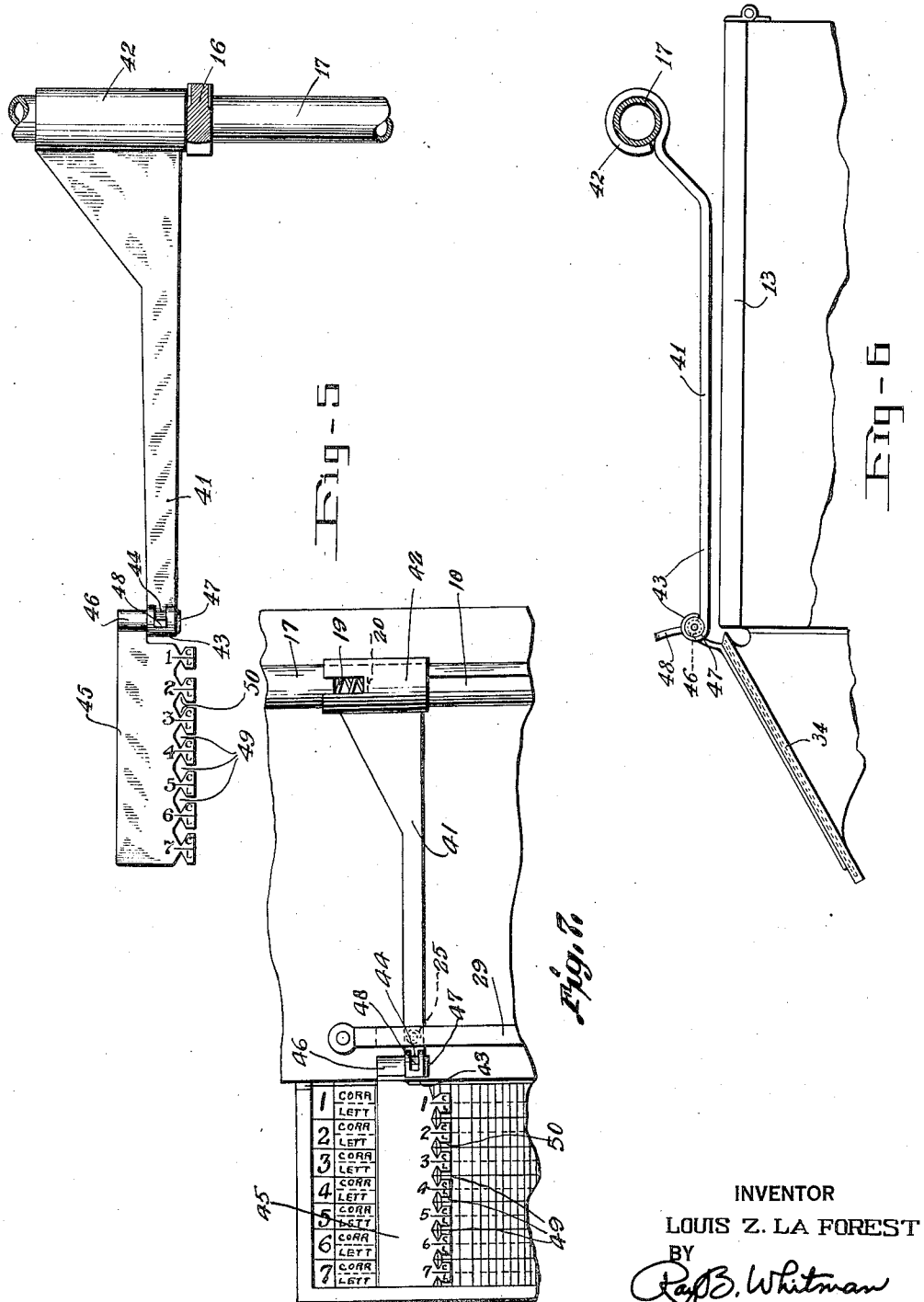
INVENTOR  
LOUIS Z. LA FOREST  
BY  
Ray B. Whitman  
ATTORNEY Patented Jan. 15, 1924.

1,480,619

UNITED STATES PATENT OFFICE.

LOUIS Z. LA FOREST, OF BRIDGEPORT, CONNECTICUT, ASSIGNOR, BY MESNE ASSIGNMENTS, TO DICTAPHONE CORPORATION, OF NEW YORK, N. Y., A CORPORATION OF NEW YORK.

CORRECTION INDICATOR FOR SOUND RECORDING AND REPRODUCING MACHINES.

Application filed January 28, 1921. Serial No. 440,577.

*To all whom it may concern:*

Be it known that I, LOUIS Z. LA FOREST, a citizen of the United States, and a resident of Bridgeport, county of Fairfield, and State of Connecticut, have invented certain new and useful Improvements in a Correction Indicator for Sound Recording and Reproducing Machines, of which the following, taken in connection with the accompanying drawings, is a specification.

This invention relates to improvements in correction devices for commercial phonographs or dictating machines, and has for its principal object the provision of a simple means for accurately and quickly noting the correction, the ending of a letter, etc. at any point on the record, and later locating such point or points during the transcription thereof.

Another object is to provide a device which will remain stationary during the normal operation of the machine, thus doing away with the distracting effect of a moving strip indicator, or marker, such as heretofore employed on like devices. By this invention, the device remains stationary until it is desired to use it, when it is then moved either manually or automatically—depending upon the particular modification of the invention used—to the position at which it is desired to indicate or locate a correction.

With these and other objects in view, the invention and one modification are shown in the accompanying drawings, and these will now be described and finally pointed out in claims.

In the drawings—

Figure 1 is an end elevation, partially in vertical section, of a dictating machine provided with one form of the invention.

Figure 2 is a plan view, from above, of the same machine with its upper part removed to show the constructional details of this form of the invention.

Figure 3 is a fragmentary perspective view of a portion of the device, arranged to be automatically actuated.

Figure 4 is a fragmentary view, partially in section, of the positioning means employed with the device.

Figure 5 is a plan view from above, of a modified form of the invention arranged to be manually operated.

Figure 6 is an end elevation thereof, showing a portion of the dictating machine in section, and Figure 7 is a plan view from above, of a further modified form of the invention arranged to be automatically operated.

The invention is illustrated in the drawings as applied to a dictating machine of well-known design, in which cylinder record 10, (Fig. 1) is mounted upon a mandrel 11 rotatably supported upon a suitable standard 12 projecting upwardly from one end of the base 13.

The carriage 14, holding the combined recorder-reproducer, is slidable above the cylinder record along a horizontal guide bar 15 and is provided with means for propelling it longitudinally as the cylinder revolves. Attached to and moving with the carriage is a forked guide arm 16, slidably embracing a lower horizontal guide bar 17.

Guide bar 17, according to the present embodiment, is of tubular form, and slotted for a portion of its length, as at 18; this portion encloses a helical spring 19, (Fig. 3), arranged to expand lengthwise within tube 17.

This spring 19 engages an inwardly projecting lug 20, (Figs. 2 and 3), formed on the hub 25 of a forwardly extending arm 22—this lug engaging the slot loosely so that a limited vertical swinging of the arm is permitted. When not otherwise held, this spring will propel the arm to the right until it is stopped by the depending arm 16, that is, until it occupies a position relative to the progression of the combined recorder-reproducer along the record.

This arm, however, is normally prevented from moving by a releasable locking device, consisting of a plurality of teeth 23, (Fig. 4), formed in the arm, which engages a toothed rack 24, secured to the base 13. This arm, through its teeth 23, is yieldably held in engagement with rack 24 by means of a plunger 25 disposed in a socket 26 formed in the arm, and is forced outwardly by a coiled spring 27. Plunger 25 engages a guide groove 28 in the underside of a bar 29, which bar is supported on posts 30 and is placed above and parallel to the rack.

A lifting lug 31, adapted to be engaged by the finger of the operator, is formed at one side of the arm to enable it to be conveniently lifted against the force of the spring 27, so as to disengage the teeth 23 from the rack 24, whereupon the arm 22 is free to move toward the guide arm 16 under the pressure of expanding spring 19.

At the front of base 13 of the dictating machine, there is mounted upon a bracket 32, an inclined correction-sheet support 33 having a channeled marginal frame portion 34 extending along the lower edge and also both ends, and within which the correction-sheet may be positioned.

Above the correction-sheet 35, the arm 22 is provided at its end with an enlarged boss, having a passage 37 formed therein parallel to the plane of the correction-sheet. Within this passage 37, there is adjustably secured the shank 38 of a tubular holder 39, (Fig 1), for the marking pencil 40. Longitudinal movement of the bar 22, together with lateral movement permitted by this adjustable mounting of holder 39, permits the pencil to be moved to any position upon the surface of the correction-sheet.

The correction-sheet is ruled so as to provide a plurality of parallel longitudinal spaces, numbered 1 to 7 in the drawing, each of which is divided longitudinally in half, the upper half having the designation "Corr," which is an abbreviation of the word "correction," and the lower half, the designation "Lett," which abbreviates the word "letter." Each of the seven horizontal divisions are intended for the correction marks of a separate record, that is, it is for use with seven different records. Crossing all of these horizontal lines is a series of vertical lines, spaced closely together, their purpose being as an aid in locating the horizontal position of a point on any of the lower horizontal strips 2 and 7, from the pointer when positioned in the upper horizontal strip 1. This eliminates the necessity of moving the pointer down across the correction-sheet to a position immediately over the particular horizontal strip being marked.

In operation this device works as follows:

It being desired to indicate that a letter has been begun or ended, or that there is a correction at a particular point on the record, arm 22 is raised by means of lug 31 to release it from the rack 24, whereupon spring 19 forces this arm along its guide bar 17 into engagement with arm 16, and at this position, since the stopping surface of arm 16 is arranged to be directly on the transverse line containing the particular point on the record desired, the "correction" or "letter" mark which is then noted on the correction-sheet will correspond with the exact point on the record being indicated.

It is, of course, understood that after the dictation has been recorded, the correction-sheet is used by the stenographer who transscribes the record, by being placed below an index pointer moving with the carriage of the reproducing machine, and in this manner the location of the various points on the record is quickly and accurately determined. It will be noted that, if desired, this index pointer could also be free of the carriage, but movable to a position relative thereto, the same as the present invention as used on the recording machine.

In Figures 5 and 6, there is illustrated a modified form of the invention, which is adapted to be manually moved to the desired position when a correction is to be noted or to be located—depending upon whether the record is being recorded or reproduced—but which otherwise remains stationary. This modification comprises a one-piece arm 41, arranged, from consideration of its economical production, to be stamped from sheet metal. This arm 41 is disposed above the base 13 and has a relatively long hub portion 42 slidable on the lower longitudinal guide bar 17, and provided at its forward end with a curled bearing portion 43 having a slot 44 therein, which slot is formed by bifurcating the end of the blank piece during manufacture.

A combined correction indicator and guide plate 45, adapted to slidably rest upon the correction-sheet, is hingeably connected to the arm 41 by having an off-set stud portion 46 formed on 45 and engaging bearing 43, and being held in place by flanging the end of the stud as at 47. A finger, or abutment 48 provided on the stud engages slot 44 and functions to limit the swinging movement of plate 45 when same is thrown up out of the way when removing the correction-sheet; at the same time, it provides a projection to be engaged by the finger to shift arm 1 into abutting relation with arm 16.

Along one edge of plate 45, (Fig. 5), there is provided a series of spaced projections 49, designated by the numbers 1 to 7 inclusive, and having V-shaped notches 50 extending from the upper and lower edges thereof toward the center, the space between each notch being provided with a central division line and on one side of this line, there is impressed, or otherwise inscribed, the letter "C" designating "correction," and below it the letter "L" designating "letter." In this form of the device, the marking means, as for instance the pencil, is carried in the hand of the operator and is guided by notches 50 to produce a sharply pointed V-shaped marking upon the correction-sheet, thereby precisely designating the point at which a correction is to be noted.

In Figure 7 there is illustrated a form of the invention in which the notched plate form of indicator, illustrated in Figures 5 and 6, is provided upon an automatically controlled indicating arm, such as that illustrated in Figures 1 to 4. The arm 41 is provided with a sleeve portion 42 bent into shape and slidable on the horizontal bar 17. A lug 20 is formed upon the sleeve and projects into the slot 18 of the bar 17 where it is engaged by a spring 19. A yieldable holding plunger 25 for retaining the arm in position, co-operates with the bar 29 in similar manner to plunger 25 shown in Figures 1 to 4. The plate 45 and its connecton to the arm 41 is identical with the corresponding connection shown in Figures 5 and 6.

It will be clear that while the sliding pencil is illustrated in connection with the automatically controlled indicating arm, and the notched indicator and guide plate is shown in conjunction with both the manually and automatically controlled indicating arm, that either or both of these parts may, of course, be used on either form of the device disclosed. And it is further understood that while there is shown and described a preferred specific form of the invention, other changes may be resorted to within the spirit and scope of the appended claims.

Having now described the invention, what is claimed as new and for which Letters Patent of the United States is desired, is:

1. In a correction device for dictating machines, correction indication means, a movable sound box carriage, an indicating member adapted to be moved to indicating position relative to the carriage, a tubular supporting guide therefor, provided with a longitudinal slot, means on the indicating member engaging the slot and permitting a limited vertical swinging movement of the indicating member, a coiled spring disposed in the tubular guide member, adapted to exert pressure on the last mentioned means to move the indicating member into relative position with the carriage, and spring-pressed releasable holding means adapted to yieldably oppose the vertical swinging movement of the indicating member and retain it stationary until released by such vertical swinging movement thereof.

2. In a correction device for dictating machines, correction indication receiving means, a movable sound box carriage, an indicating member adapted to be moved to indicating position relative to the carriage, a tubular supporting guide member therefor, provided with a longitudinal slot, means on the indicating member engaging the slot and permitting a limited vertical swinging movement of the indicating member, a coiled spring disposed in the tubular guide member, adapted to exert pressure on the last mentioned means to move the indicating member into relative position with the carriage, and releasable holding means adapted to retain the indicating member stationary until released by vertical swinging movement of the indicating member.

3. In a correction device for dictating machines, correction indication receiving means, a movable sound box carriage, an indicating member adapted to be moved to indicating position relative to the carriage, a tubular supporting guide member therefor, provided with a longitudinal slot, means on the indicating member engaging the slot, a coiled spring disposed in the tubular guide member, adapted to exert pressure on the last mentioned means to move the indicating member into relative position with the carriage, and releasable holding means adapted to retain the indicating member stationary until released.

4. In a correction device for dictating machines, correction indication receiving means, a movable sound box carriage, an indicating member adapted to be moved to indicating position relative to the carriage, releasable holding means therefor, comprising a stationary serrated rack, spring-pressed means carried by the indicating member, adapted to be yieldably and releasably engaged with the rack, and means for moving the indicating member to such indicating position when released.

5. In a correction device for dictating machines, correction indication receiving means, a movable sound box carriage, an indicating member adapted to be moved to indicating position relative to the carriage, releasable holding means therefor, and means adapted to move it to such indicating position when released.

6. In a correction device for dictating machines, a correction-sheet having a plurality of separate zones, each adapted to receive a plurality of different markings individual to a single record, an indicating member comprising a plate adapted to overlie and travel across a correction-sheet, and having a plurality of spaced indicating projections along an edge transversely of the sheet, one for each zone and each of the projections having a plurality of spaced pencil guiding means and each adapted to guide the pencil to a point upon fixed longitudinal lines of the correction-sheet, whereby a plurality of such markings in longitudinally spaced relation will be longitudinally aligned.

7. In a correction device for dictating machines, a sound box carriage, and indicating means including a marker guide disposed above the correction indication receiving means, and having a plurality of indicating portions each having a plurality of pencil guiding means.

8. In combination with the movable carriage of a commercial phonograph, indicating means comprising a stationary receiving surface, and an indicator automatically movable at will to indicating position independently of the carriage.

9. In combination a correction-sheet for dictating machines having a plurality of longitudinal divisions consecutively numbered, and adapted to respectively receive indicia relating to a single record, and an indicating plate adapted to have movement relatively to the correction-sheet and overlying the sheet, and having a plurality of indicating portions each provided with the same plurality of designations individual to the respective longitudinal divisions of the sheet.

10. In combination a correction-sheet for dictating machines having a plurality of longitudinal divisions consecutively numbered, and adapted to respectively receive indicia relating to a single record, and each divided longitudinally to provide spaces for different indication markings, and an indicating plate adapted to have movement relatively to the correction-sheet and overlying the sheet, and having a plurality of indicating portions each provided with the same plurality of designations individual to the respective longitudinal divisions of the sheet and designating the longitudinal spaces of said longitudinal divisions.

11. In a device of the class described, indication receiving means, and other means, including a plurality of substantially V-shaped notches, for locating the points to be indicated, said other means being adapted to locate and guide a hand-held marker to a plurality of positions on the receiving means along the same transverse line and on different horizontal lines.

12. As a new article of manufacture, a correction sheet for dictating-machine use, having a plurality of longitudinally-extending zones, each adapted to take all the corrections of a single record.

13. In a device of the class described, a plurality of zones adapted to respectively receive the corrections of a plurality of records, and other means associated with said correction receiving zones for locating the corrections to be made for each of said records.

14. In combination, a dictating machine, including a record cylinder and a sound-box carriage, having relative longitudinal movement, a correction device comprising correction-indication-receiving means, and an indicating member adapted to be moved independently of the movement between the sound-box carriage and the record cylinder to an indicating position relative thereto, and movement limiting means for the indicating member to determine said indicating position, said means being movable with the sound-box carriage and forming an operating part thereof.

15. In combination, a dictating machine, including a record cylinder and a sound-box carriage, having relative longitudinal movement, a correction device comprising correction-indication-receiving means, and an indicating member adapted to be moved independently of the movement between the sound-box carriage and the record cylinder to an indicating position relative thereto, and the operative part of the carriage constituting an abutment for determining the indicating position of said indicating member.

16. In combination with the movable carriage of a commercial phonograph, indicating means comprising a receiving surface and an indicator, the receiving surface and the indicator being automatically movable at will to indicating position relative to each other and independently of the carriage.

Signed at Bridgeport, in the county of Fairfield, and State of Connecticut, this 24th day of January A. D. 1921.

LOUIS Z. LA FOREST.